United States Patent [19]
Carlson et al.

[11] Patent Number: 5,926,834
[45] Date of Patent: Jul. 20, 1999

[54] VIRTUAL DATA STORAGE SYSTEM WITH AN OVERRUN-RESISTANT CACHE USING AN ADAPTIVE THROTTLE BASED UPON THE AMOUNT OF CACHE FREE SPACE

[75] Inventors: Wayne Charles Carlson, Tucson; Gregory Tad Kishi, Oro Valley; Jonathan Wayne Peake, Tucson, all of Ariz.

[73] Assignee: International Business Machines Corporation, Armonk, N.Y.

[21] Appl. No.: 08/865,339

[22] Filed: May 29, 1997

[51] Int. Cl.⁶ .................................................. G06F 13/18
[52] U.S. Cl. .......................... 711/152; 711/118; 711/135; 711/161
[58] Field of Search .................................... 711/113, 118, 711/133, 135, 152, 151, 158, 161, 162

[56] References Cited

U.S. PATENT DOCUMENTS

| 4,499,539 | 2/1985 | Vosacek | 707/205 |
| 5,155,835 | 10/1992 | Belsan | 711/114 |
| 5,455,924 | 10/1995 | Shenoy | 711/118 |
| 5,566,315 | 10/1996 | Milillo | 711/154 |
| 5,687,348 | 11/1997 | Whittaker | 711/133 |
| 5,719,800 | 2/1998 | Mittal | 364/707 |
| 5,761,716 | 6/1998 | Byrn | 711/133 |
| 5,809,274 | 9/1998 | Nishimukai | 395/386 |

*Primary Examiner*—John W. Cabeca
*Assistant Examiner*—Christopher S. Chow
*Attorney, Agent, or Firm*—Robert M. Sullivan

[57] ABSTRACT

A virtual data storage system provides a method and apparatus for adaptively throttling transfers into a cache storage to prevent an overrun in the cache storage. The virtual data storage system includes a storage interface appearing as a set of addressable, virtual storage devices, a cache storage for initially storing host-originated data files, storage devices for eventually storing the data files on a set of storage volumes, and a storage manager for directing the data files between the cache storage and the storage devices. An amount of available space in the cache storage, or a cache free space, is monitored against an adjustable cache space threshold. A storage throttle is computed when the cache free space drops below the cache space threshold. Additionally, a recall throttle is computed based on the cache free space and a number of storage devices reserved for recalling data files from the set of storage volumes. A maximum value of the storage throttle and the recall throttle is used to delay the storing of data files and the recalling of data files into the cache storage and to prevent overrunning the cache storage by completely depleting the cache free space.

30 Claims, 4 Drawing Sheets

VIRTUAL DATA STORAGE SYSTEM WITH AN OVERRUN-RESISTANT CACHE USING AN ADAPTIVE THROTTLE BASED UPON THE AMOUNT OF CACHE FREE SPACE

FIELD OF THE INVENTION

The present invention relates generally to virtual data storage systems, or more commonly implemented as virtual tape storage systems. More particularly, the present invention concerns adaptively throttling data transfers that are inputs to a cache storage within the virtual data storage system to prevent overrunning the cache storage. Input operations fill the cache storage at a faster rate than output operations empty it, and include data transfers originated from a host processing system and recall operations controlled by a storage manager within the virtual data storage system. The present invention monitors the free space within the cache storage and throttles both the write and recall operations.

BACKGROUND OF THE INVENTION

Data processing systems typically require a large amount of data storage. These systems often comprise multiple host processors concurrently storing data to multiple storage volumes through multiple drive units. The data storage within these systems often includes removable media, such as magnetic tape or optical disk, since it is useful for data that must be stored for long periods of time, data that is infrequently accessed, or data that is backed-up or migrated from more accessible storage media, such as electronic memory or DASD. Removable media also has an economic advantage in that it provides a lower cost per unit of storage.

Virtual data storage systems, more commonly implemented as virtual tape storage (VTS) systems, have recently been developed to increase the efficiency and economics of tape storage systems. Tape storage systems which attach to multiple host processing systems typically require many tape drives to accommodate concurrent demands made by separate host processors for accessing separate tape storage volumes. Accordingly, the tape storage system may utilize the tape drives in bursts of high activity separated by intervals of little activity. VTS systems overcome this problem by providing interfaces to the host processors for addressing many more tape drives than actually exist within the storage subsystem. The attached host processors transfer data files to the VTS system as tape volumes, or logical volumes. The VTS system first stores the logical volumes as files in a cache storage, such as a direct access storage device (DASD) or an electronic memory, and subsequently writes the data files from the cache storage to the tape storage subsystem. When the logical volume has been stored in the cache storage, it appears to the host processor that the logical volume has been stored as a tape volume in the VTS system. The VTS system manages the migration of the data file to a tape storage volume, and selects which physical tape drive is used to write the data to tape.

The VTS system uses the cache storage to buffer data transfers between the tape storage and the attached host processors. When the host processors write data to the VTS system, the data is stored in the cache storage. Likewise, host mount requests involve the cache storage. If the requested data file is contained within the cache storage, a "cache hit" allows the VTS system to immediately make the data available to the host processor. If the requested file has been migrated to a tape volume, the VTS system must recall the file from the tape volume, which copies the file into the cache storage, and then make the data available to the requesting host processor from the cache storage. The VTS system also uses the cache storage to provide quick responses to the attached host processors. Host write operations complete once the logical volume has been stored as a data file in the cache storage. As stated earlier, host read operations complete quickly when a cache hit allows the VTS system to transfer the requested logical volume immediately from the cache storage. Thus, the VTS system must manage the cache storage and the tape storage volumes such that the more frequently requested data files, or logical volumes, reside in the cache storage.

The VTS must also manage the capacity of the cache storage. Write operations from the attached host processors fill the cache storage with data files. Additionally, host read operations can also fill the cache storage with data files. If the read operation results in a cache miss, because the data file was previously migrated to a tape storage volume, the requested data file must be recalled from the tape storage volume to the cache storage and then transferred to the host processor. Higher performance, efficient VTS systems also premigrate data files from the cache storage to the tape storage volumes. That is, the VTS system copies the data file to a selected tape storage volume, but does not remove the file from the cache storage. In this scheme, the VTS system has transferred the data file as a logical volume to the tape storage volume, but has kept a copy in the cache storage, providing faster host access to the data file. Thus, premigrating data files provides no relief to the storage capacity constraints placed on the cache storage. The VTS system must migrate infrequently accessed data files from the cache storage to provide available space for the incoming data files. Typically, the cache storage fills at a faster rate than it is emptied. Thus, the cache storage would quickly overrun, or overflow its capacity, without some means to balance the incoming data rate with the outgoing data rate.

Therefore, a method and system is needed within a virtual data storage system, more commonly implemented as a virtual tape storage (VTS) system, to balance the incoming data rate with the outgoing data rate once the cache storage approaches a threshold of available, or free, space. It is also preferred that the method and system automatically adapt as circumstances relating to the cache storage change.

SUMMARY OF THE INVENTION

An object of the present invention is to provide an improved method in a virtual data storage system for adaptively throttling an incoming data rate to a cache storage as the available space in the cache storage approaches several thresholds. The method monitors the available space and variably slows the incoming data rates according to how the available space compares to the thresholds. This method of adaptively throttling the incoming data rates prevents the incoming host operations from overrunning the cache storage in the virtual data storage system.

Another object of the present invention is to provide a virtual data storage system which adaptively throttles an incoming data rate to a cache storage as the available space in the cache storage approaches several thresholds. The system monitors the available space and variably slows the incoming data rates according to how the available space compares to the thresholds. This apparatus for adaptively throttling the incoming data rates prevents the incoming host operations from overrunning the cache storage in the virtual data storage system.

A first embodiment of the present invention includes a method within a virtual data storage system for adaptively throttling host processor and storage subsystem operations which insert data into a cache storage. The method monitors the amount of available space, or free space, within the cache storage. The method then compares the cache free space with a minimum and maximum threshold to compute a storage throttle value. The method also calculates a recall throttle based on the cache free space and the number of drives available for concurrent recall operations. The method further calculates a premigration throttle based on the percentage of resident files stored in the cache storage. The overall throttle value is the maximum of the storage throttle, the recall throttle, and the premigration throttle. The method uses the overall throttle to delay host processor and storage subsystem operations that insert data files into the cache storage.

Another embodiment of the present invention includes a virtual data storage system for adaptively throttling host processor and storage subsystem operations which insert data into a cache storage. The virtual data storage system receives the data files from an attached host processing system and includes a plurality of storage volumes, the cache storage, a plurality of drive units, a database storage, and an interconnected storage manager, or storage controller. The storage manager monitors the amount of available space, or free space, within the cache storage. The storage manager then compares the cache free space with a minimum and maximum threshold to compute a storage throttle value. The storage manager also calculates a recall throttle based on the cache free space and the number of drives available for concurrent recall operations. The storage manager further calculates a premigration throttle based on the percentage of resident files stored in the cache storage. The overall throttle value is the maximum of the storage throttle, the recall throttle, and the premigration throttle. The storage manager uses the overall throttle to delay host processor and storage subsystem operations that insert data files into the cache storage.

A still another embodiment of the invention includes an article of manufacture for use in a virtual data storage system. The virtual data storage system includes a storage manager, or storage controller, for adaptively throttling, or delaying, host processor and storage subsystem operations which insert data into a cache storage. The storage manager computes a throttle based on the amount of available space, or free space, in the cache storage to prevent an overrun from occurring within the cache storage. The article of manufacture comprises a computer-readable storage medium tangibly embodying a program of executable computer instructions. The computer instructions may cause the storage manager to execute the method steps described in the first embodiment of the invention.

The foregoing and other objects, features, and advantages of the invention will be apparent from the following more particular description of a preferred embodiment of the invention, as illustrated in the accompanying drawings.

DETAILED DESCRIPTION

Figure 1:
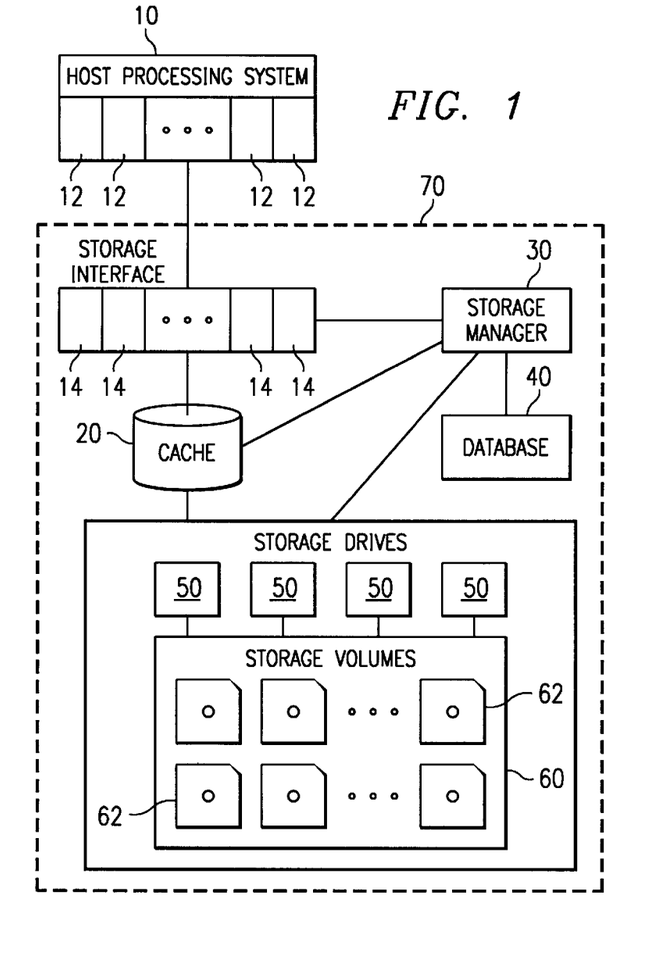
FIG. 1 is a block diagram showing an interconnection of functional components of a virtual data storage system for adaptively throttling incoming data operations to a cache storage in accordance with the present invention.

Referring more particularly to the drawings, like numerals denote like features and structural elements in the various figures. The invention will be described as embodied in a virtual data storage system for adaptively throttling host processor and storage subsystem operations, which input data into a cache storage, once the available space within the cache storage approaches an adjustable threshold. Turning now to FIG. 1, a block diagram representing a virtual data storage system 70, for example the IBM 3494 Virtual Tape Storage System, is shown coupled to a host processing system 10. Applications programs running within the host processing system 10 generate data to be stored on logical volumes within the virtual data storage system 70. The host processing system 10 may be embodied by a variety of types and numbers of processing units, such as a mainframe computer, a personal computer, or a workstation. The virtual data storage system 70 includes a storage manager, or storage controller, 30 interconnected to a storage interface 14, a cache 20, a database storage 40, a set of drive units 50, and a storage subsystem 60 having a plurality of storage volumes 62. The storage manager 30 is also coupled to the host processing system 10, and may comprise a digital processing apparatus such as a microprocessor, personal computer, or more advanced processing machine. The storage volumes 60 may consist of various types of sequential storage media, such as magnetic tape or optical disk. The drive units may also include magnetic tape drives, such as the IBM 3590 High Performance tape drive, or optical disk drives.

The virtual data storage system 70 appears to the host processing system 10 as multiple storage devices, such as 32 IBM 3490 tape storage devices, each with a unique address 12 from the host processing unit 10. The storage interface 14 within the virtual data storage system 10 provides a data path for each of these virtual devices 14. The host processing system 10 writes a data file to a specific virtual storage device 12 within the virtual data storage system 70. The data file is transferred along a selected data path 14 corresponding to the virtual device address 12. The storage manager 30 directs the host-originated data file to the cache storage 20, recording the data file identifier and its cache storage position in a directory within the cache storage.

The data file must eventually be written to a selected storage volume 62 within the storage subsystem 60. The storage manager 30 also controls the transfer of data files between the cache storage 20 and the storage subsystem 60. The data files pass through three stages in the virtual data storage system 70: 1) resident files, data files stored only in the cache storage 20; 2) premigrated files, data files stored in the cache storage 20 and copied to a selected storage volume 62; and 3) migrated files, data files stored only on a selected storage volume 62 within the storage subsystem 60. The storage manager 30 controls the initial premigration and eventual migration of data files from the cache storage 20 to the storage subsystem 60. The storage manager 30 also maintains reference information and storage volume location information about premigrated and migrated files within a database storage 40. When the host processing system 10 request a logical volume, or data file, from the virtual data storage system 70, resident and premigrated files are accessed from their location in the cache storage 20. Migrated files are recalled from their location in the storage subsystem 60 to the cache storage 20 and accessed by the host processing system 10 through the cache storage 20. Thus, write operations and recall operations insert data files into the cache storage 20, while migration operations remove data files from the cache storage 20.

Figure 2:
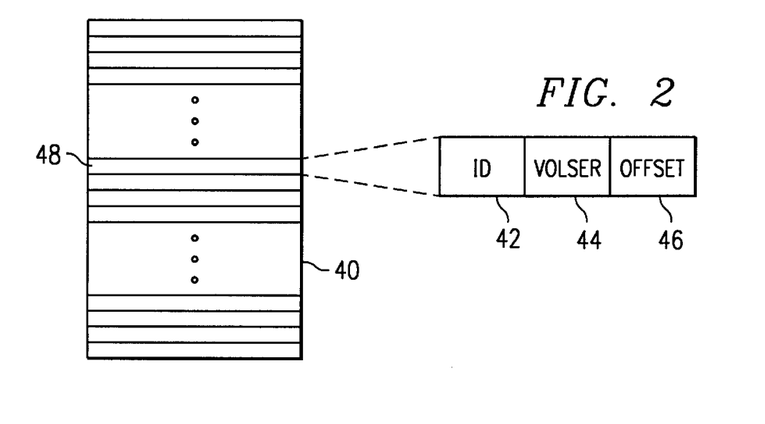
FIG. 2 is a block diagram showing a database storage as depicted in the virtual data storage system of FIG. 1, in accordance with the present invention.

FIG. 2 shows a block diagram representing the database, or catalog, within the database storage 40. The database 40 contains an entry for each data file received from the host processing system 10 and written to a storage volume 62 within the storage subsystem 60. FIG. 2 also shows an exploded view of an exemplary entry 48 into the database 40. The entry includes a data file identifier 42, a storage volume identifier 44, and a storage volume offset 46. The data file identifier 42 identifies a particular logical volume, or data file, received from the host processing system 10. The storage volume identifier 44 specifies the storage volume 62 where the data file was eventually written. This identifier 44 is typically a storage volume serial number, or a storage volume label, which uniquely identifies the selected storage volume 62 in the storage subsystem 60. The storage volume offset 46 indicates a position within the sequential media of the storage volume 62 where the data file is stored. An offset onto the storage volume 62 is necessary, since volume stacking now allows multiple logical volumes, including multiple data files, to be stored on a single physical storage volume 62. The combination of the storage volume identifier 44 and the storage volume offset 46 effectively provide a pointer to the logical volume, or data file, within the virtual data storage system 70. Accordingly, the database storage 40 is very small relative to the storage capacity of the storage subsystem 60, since a pointer to the data file occupies a very small fraction of the storage needed for the actual data file.

Figure 3:
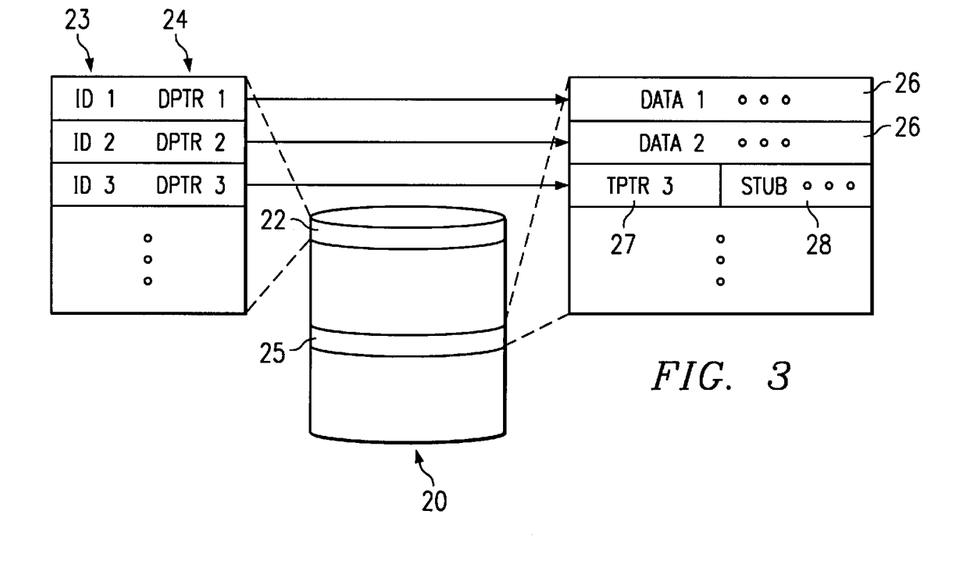
FIG. 3 is a block diagram representing storage of logical volumes as data files in a cache storage as depicted in the virtual data storage system of FIG. 1, in accordance with the present invention.

FIG. 3 shows a block diagram representing the storage of logical volumes as data files in the cache storage 20, including an exploded view of a cache directory 22 and a main storage area 25. The cache storage 20 includes a cache directory 22 for indexing to the data files 26 and a main storage 25 for storing the data files 26. The cache directory 22 includes an entry for each data file stored within the virtual data storage system 70. Each entry 22 contains a data file identifier 23 and a pointer 24 to the data file 26 within the cache storage 20. The main storage area 25 of the cache storage 20 contains the data files 26. The main cache storage 25 contains resident files 26, premigrated files 26, and reference pointers 27 to migrated files 28. The cache storage 20 contains the actual data for resident and premigrated files 26, but only contains a data stub 28 for migrated files. The data stub 28 includes a pointer 27 to the data file location on a selected storage volume 62 within the storage subsystem 60. As described earlier, the storage manager 30 directs the transfer of data files 26 within the virtual data storage system 70. The storage manager 30 also decides when to premigrate, and migrate, data files 26 from the cache storage 20 to the storage subsystem 60.

Figure 4:
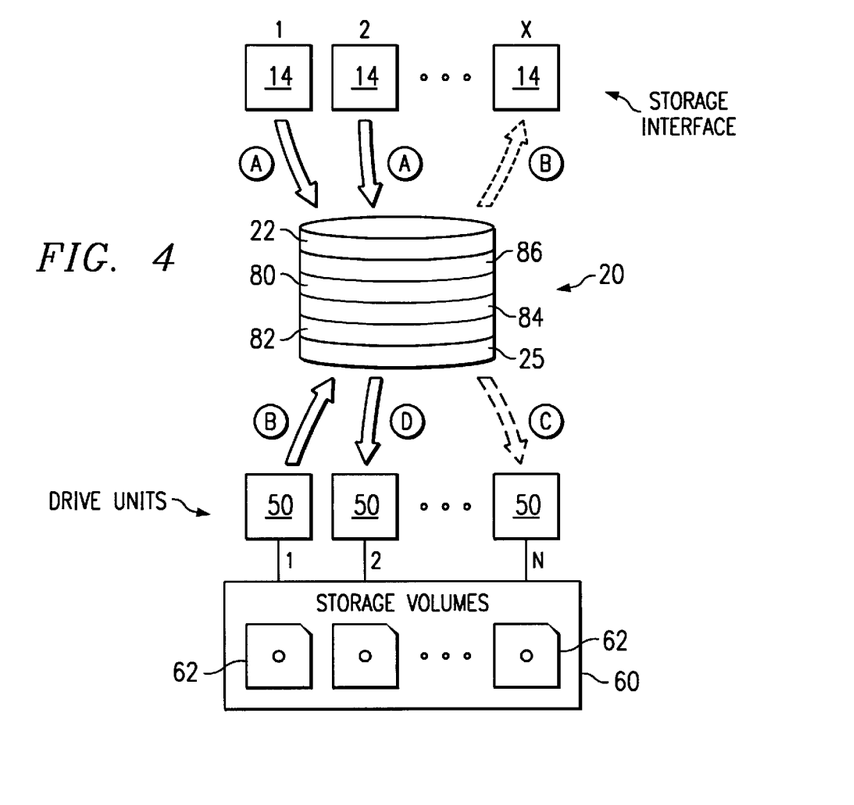
FIG. 4 is a block diagram illustrating input operations which fill the cache storage and output operations which empty the cache storage in accordance with the present invention.

FIG. 4, shows a block diagram representing the operations inserting data files 26 into the cache storage 20 and the operations removing data files 26 from the cache storage 20. The diagram shows data paths into and out of the cache storage 20. The storage interface 14 provides X data paths to the host processing system 10 while the drive units 50 provide N data paths to the storage volumes 62 within the storage subsystem 60. The virtual data storage system 70 typically contains more virtual storage devices, or data paths 14, to the host processing system 14 than physical storage devices 50, or data paths, to the storage subsystem 60.

The cache storage 20 includes a cache directory 22, a main cache storage 25, and free space 80 within the cache storage 20. The cache free space 80 typically includes free space thresholds 82, 84, 86. When the cache free space 80 approaches any of these thresholds, throttles must be set to delay, or slow down, the input operations from filling the main storage 25 and eliminating the cache free space 80. In the present embodiment, a first free space threshold 82, denoted an auto threshold, indicates how much data is desired in the cache storage 20 for potential cache hits. If the amount of cache free space is greater than the free space associated with the auto threshold, no throttling is needed. A second threshold, a minimum threshold 84 in the present embodiment, correlates to an amount of cache free space where throttling must start. Finally, a third threshold, a maximum threshold 86 in the present embodiment, denotes a minimum amount of cache free space 80 required for the virtual data storage system. As the amount of cache free space 80 diminishes to the free space associated with the maximum threshold 86, a maximum amount of throttling is required for operations inserting data files 26 into the cache main storage 25.

Four events, A,B,C, and D, depict data operations inserting and removing data files 26 from the cache storage 20. The storage manager 30, not shown in the data transfer diagrams, controls the depicted data operations and directs the data files 26 within the virtual data storage system 70. Event A represents a write operation originating from the host processing system 10. Data files 26 written from the host processing system 10 are immediately stored in the cache storage 20. Event B depicts a read operation requested by the host processing system 10. The virtual storage system 70 transfers the file from the cache storage 20 to the requesting host processor 10. Cache read hits allow the virtual data storage system 70 to immediately transfer the requested data file 26 from the cache storage. When the host processing system 10 requests data files 26 not located in the cache storage 20, the data file 26 must be recalled from the storage subsystem 60. The corresponding storage volume 62 is loaded into a drive unit 50 and the requested data file 26 is copied to the cache storage 20. The data file 26 is then transferred to the host processing system 10 and remains in the cache storage 20. Thus, host read operations fill the cache storage 20, by either recalling the requested data file 26 into the cache storage 20 or by delaying the migration of the requested file from the cache storage 20.

Event C represents a premigration of a data file 26 from the cache storage 20 to a selected storage volume 62 within the storage subsystem 60. As described earlier, a premigrated data file 26 is copied from the cache storage 20 to the storage subsystem 60. The premigrated file, however, remains in the cache storage 20. Thus, premigration operations within the virtual data storage system 70 do not remove data files 26 from the cache storage 20, or increase the cache free space 80. Alternatively, event D represents an operation which removes data files 26 from the cache storage, a migration of a data file 26 to the storage subsystem 60. As previously stated, the storage manager 30 migrates infrequently accessed data files 26 from the cache storage 20. The migration of data files converts the storage space where the migrated data file resides in the main storage 25 into free space 80 in the cache storage 20. In the present embodiment, the migrated data file 26 was copied to the storage volume 62 in an earlier premigration. Thus, the migration operation does not transfer the data file 26 to the storage volume, but instead simply removes the data file 26 from the cache storage. The migration of the data file 26, however, represents a depletion of the cache storage 20, which is depicted in the figure. In addition, the above-mentioned operations not only contend for cache storage 20, but also compete for the processing resources of the storage manager 30. Therefore, a method for throttling one operation within the virtual data storage system 70 not only adjusts the cache storage free space 80, but also allows a contending operation to consume more of the storage manager 30 processing resources.

Figure 5A:
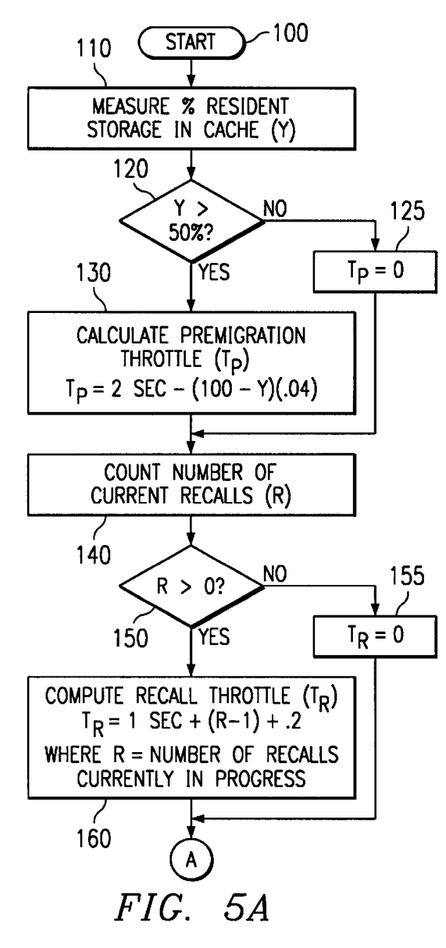
FIGS. 5A and 5B show a flow diagram depicting an illustrative sequence of operational steps used to compute a throttle based on the amount of available space in the cache storage according to the present invention.
Figure 5B:
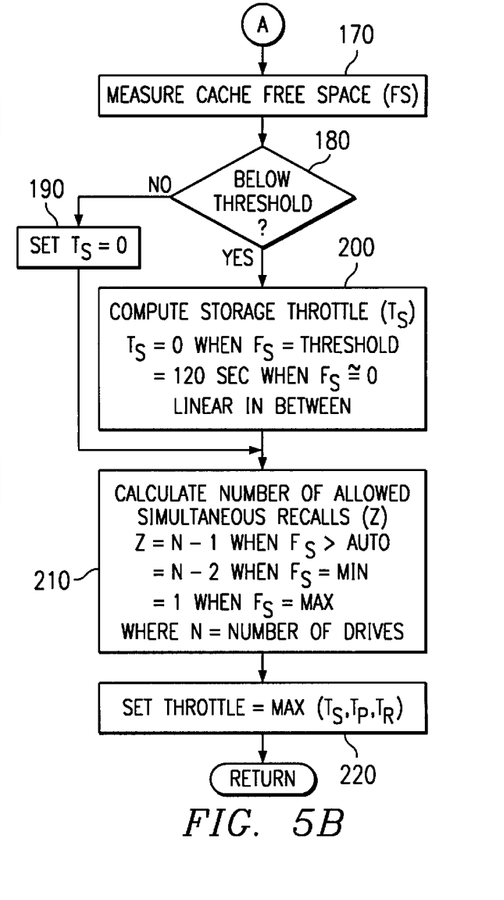

FIGS. 5A and 5B describe a method 100, within the virtual data storage system 70, for computing a throttle based on the amount of available space 80 in the cache storage 20. In the present embodiment of the invention, a throttle represents a time delay, used to slow down operations that insert data files 26 into the cache storage 20. However, one ordinarily skilled in the art could easily understand that the throttle could represent other means for slowing down the incoming data rates to the cache storage. A step 110 determines the number of resident files 26 in the cache storage 20 and compares the amount of cache storage occupied by resident files 26 to the total storage capacity of the cache storage 20. The storage manager 30 typically scans the cache directory 22, searching the data file identifiers 23 for each data file 26 to determine which data files 26 are resident files. A step 120 determines whether the percentage of cache storage occupied by resident files, or resident storage, exceeds half of the cache storage 20 capacity. If not, a step 125 sets a premigration throttle, Tp, to zero and continues to a step 140. Otherwise if so, a step 130 calculates the premigration throttle Tp. The premigration throttle is set to zero when the resident storage percentage equals 50 percent. Alternatively, the premigration throttle is set to two seconds when the resident storage percentage equals 100 percent. In between 50 and 100 percent, the premigration throttle is linearly adjusted. In equation form, the premigration throttle in the present illustrative embodiment is as follows:

$$Tp=2.00-(100-Y)*0.04 \text{ in seconds};$$

where Y=the resident storage percentage.
A step 140 counts the number of allowed simultaneous recalls. A recall throttle, Tr, is calculated based on the number of drive units 50 currently used by the storage manager 30 for recall operations. A step 150 determines if the number of recalls is non-zero. If not, a step 155 sets the recall threshold, Tr, to zero and continues to a step 170. Otherwise if so, a step 160 computes the recall throttle, Tr. In the present illustrative embodiment, the recall throttle is linearly based on the number of current recall operations, or recall operations in progress. In turn, the number of current recalls is bounded by the number of drives 50 reserved for concurrent recall operations. Accordingly, the number of drives reserved for concurrent recalls can be reduced as the cache free space 80 diminishes. In equation form, the recall throttle is calculated as follows:

$$Tr=1.00+(R-1)*0.2 \text{ in seconds};$$

where R=the number of recalls currently in progress.
In FIG. 5B, a step 170 measures the amount of cache free space 80. The storage manager 30 typically manages the amount of cache free space, since the storage manager 30 typically controls the operations which affect the cache storage 20. As described previously, the storage manager 30 directs data transfers into the cache storage 20 (such as writes from the host, and recalls from storage volumes) and data transfers out of the cache storage 20 (such as migrates to storage volumes). A step 180 determines whether the amount of free space 80 is below either the maximum 86 or minimum 84 free space thresholds. If not, a step 190 sets a storage throttle, Ts, to zero and continues to a step 210. Otherwise if the amount of free space 80 is below either threshold 84, 86, a step 200 calculates the storage throttle, Ts. In the present embodiment, the storage throttle is set to 120 seconds when the cache free space 80 equals the maximum threshold 86, and set to zero when the cache free space 80 is equal to the minimum threshold 84. In addition, the storage throttle, Ts, is linearly adjusted as the free space 80 moves between the two thresholds 84, 86.

A step 210 then calculates the number of drives to be used for simultaneous recalls. The present embodiment sets the concurrent recall number, Z, to one if the cache free space 80 is at an amount of free space corresponding to the maximum threshold, and N−2 if the cache free space 80 is at an amount of free space corresponding to the minimum threshold, where N represents the number of drives units 50. The concurrent recall number provides an upper boundary for the current number of recalls, R. As previously described, the current number of recalls, R, is used to calculate the recall throttle, Tr. Thus, if the cache free space 80 is equivalent to the amount of free space corresponding to the maximum threshold 86, the allowable number of simultaneous recalls is set to one and the recall throttle for the one drive is calculated as one second. Likewise, if the cache free space 80 is equivalent to the amount of free space corresponding to the minimum threshold 84, the allowable number of simultaneous recalls is set to N−1, and the recall throttle for each concurrent recall operation is lengthened beyond one second.

A final step 220 sets the throttle to the maximum value between the storage throttle, the premigration throttle, and the recall throttle. As noted in the previous description of the present embodiment, the storage throttle includes a much longer delay, up to 120 seconds, than either the premigration or recall throttles. As such, the storage throttle provides a much more significant adjustment to the performance of the virtual data storage system 70, as compared to the "fine tuning" provided by the premigration and recall throttles. In addition to delaying operations that insert data files 26 into the cache storage 20, throttling also allocates more system resources, such as the processing resources of the storage manager 30, to operations that remove data files from the cache storage 20. Thus, throttling has a two-fold effect on the available space 80 in the cache storage 20. Throttling slows down the host write, host read, and recall operations, and correspondingly speeds up the premigration and migration operations within the virtual data storage system 70.

In addition, the present embodiment uses a linear progression when setting throttle values corresponding to cache free space 80 measurements between the minimum 84 and maximum thresholds 86. However, one of ordinary skill in the art would understand that non-linear progressions could also be used. As an example, the throttling delays could increase at an accelerating rate as the cache free space decreased toward the maximum threshold 86. Additionally, an hysteresis algorithm could be used to calculate the throttling values. In such an algorithm, a most recent "m" number of throttling values could be stored in an array. The throttling values could be stored in the array based on their sequence in time and a second derivative could be calculated. When the second derivative indicates that the throttling delays have peaked and are reducing in value, the minimum threshold 84 can be lowered to allow the cache storage 80 to be emptied at an increased rate as the cache free space 80 grows towards the minimum threshold 84.

Figure 6A:
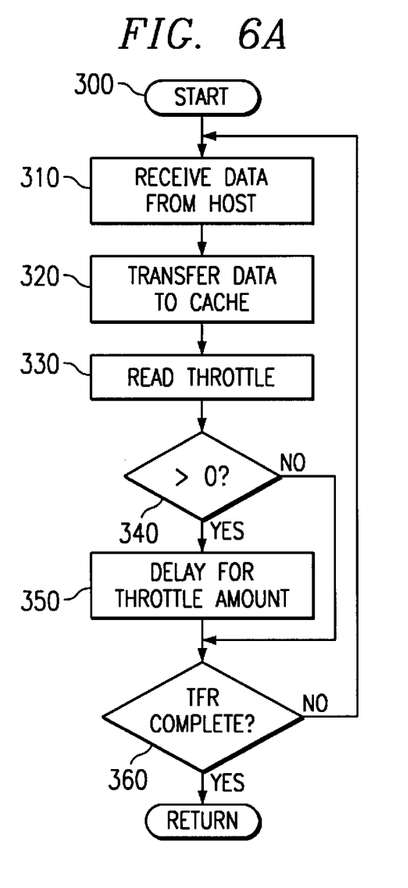
FIGS. 6A and 6B show flow diagrams depicting an illustrative sequence of operational steps used to delay, or throttle, host write operations and storage volume recall operations into the cache storage according to the present invention.

Referring to FIG. 6A, a method 300 is shown for receiving data files 26 from the host processing system 10, using the throttling techniques of the present invention. A step 310 receives a block of data from the host processor 10. As described earlier, the storage interface 14 provides data paths, with addresses to virtual storage devices 12, from the host processing system 10 to the virtual data storage system 70. A step 320 transfers the data block to the cache storage 20. As previously described, the storage manager 30 directs the data between the storage interface 14 and the cache storage 20. The storage manager 30 also updates the database 40 and the cache directory 22 to reflect the data file 26 and its storage location. A step 330 reads the throttle. The storage manager 30 typically maintains the throttle value, either in a control structure, data structure, or internal register.

A step 340 determines whether throttling is required, that is whether the throttle value is non-zero. If so, a step 350 delays the host transfer operation for a time corresponding to the throttle value. If not, a step 360 determines whether the host write transfer operation is complete. If not, more data is received from the host processor 10 at step 310. Otherwise, the host write operation has completed. It should be noted that these method 300 steps could be concurrently executed by host write transfer operations occurring on different virtual devices 12 within the storage interface 14. In this situation, the throttle value would apply to each of these host operations.

Figure 6B:
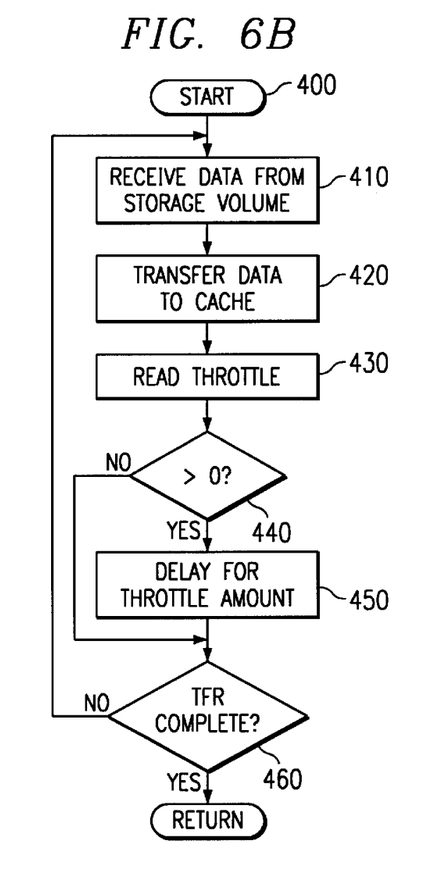

In FIG. 6B, a method 400 is shown for receiving data files 26 from a storage volume 62 during a recall operation, using the throttling techniques of the present invention. The method 400 for throttling a recall operation is very similar to the method for throttling host operations as described in FIG. 6A. A step 410 receives a block of data from the storage subsystem 60. The storage manager 30 loads a selected storage volume 62 into an available drive unit 50 and receives a copy of the data file 26. A step 420 transfers the data block to the cache storage 20. Again, the storage manager 30 directs the data between the selected drive unit 50 and the cache storage 20. As with the host operations described in FIG. 6A, the storage manager 30 also updates the database 40 and the cache directory 22 to reflect the data file 26 and its new cache storage location. A step 430 reads the throttle, typically stored in a data structure internal to the storage manager 30.

A step 440 determines whether throttling is required, that is whether the throttle value is non-zero. If so, a step 450 delays the recall operation for a time associated with the throttle value. If not, a step 460 determines whether the recall operation has completed. If not, more data is received from the selected storage volume 62 loaded into the drive 50 at step 410. Otherwise, the recall operation has completed. It should be noted that these method 400 steps could be concurrently executed by recall operations occurring from different storage volumes 62 loaded into separate drives 50 within the storage subsystem 60. In this situation, the throttle value would apply to each of these recall operations.

Figure 7:
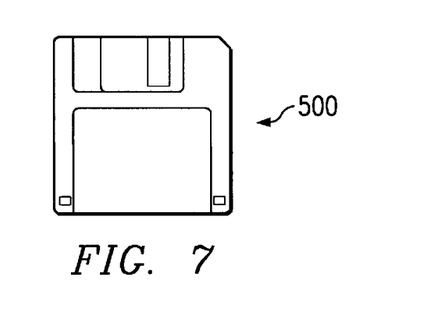
FIG. 7 shows an exemplary article of manufacture according to the present invention.

FIG. 7 depicts a storage medium 500 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

Using the foregoing specification, the present invention may be implemented as a machine, process, or article of manufacture by using standard programming or engineering techniques to produce computer software, firmware, hardware, or a combination thereof. Any resulting programs may be embodied within one or more computer usable media such as memory devices or transmitting devices, thereby making a computer program product or article of manufacture according to the invention. As such, the terms "article of manufacture" and "computer program product" as used in the following claims are intended to encompass a computer program existing on any memory device or in any transmitting device. Memory devices include fixed (hard) disk drives, diskettes, optical disks, magnetic tape, and semiconductor memories such as ROM, PROM, etc. Transmitting devices include the internet, electronic bulletin board and message/note exchanges, telephone/modem-based network communication, hard-wired/cable communication network, cellular communication, radio wave communication, satellite communication, and other stationary or mobile network systems and communication links. A computer program product as described above may be used by transmitting it via any of the foregoing transmitting devices.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the invention has been particularly shown and described with reference to preferred embodiments thereof, it will be understood by those skilled in the art that various changes in form and details may be made therein without departing from the spirit and scope of the invention. For example, the throttles have been represented as time delays, but could also represent alternative means for reducing incoming data rates to the cache storage. In addition, the throttle values have been calculated using empirical values, such as a 50 percent resident storage, a 120 second storage throttle, and a 2 second premigration throttle. These empirical values could be varied, and the relative ratios between the storage throttle, the premigration throttle, and the recall throttle could also be changed. Finally, linear functions have been used to calculate throttle values between the minimum and maximum thresholds within the cache storage. Non-linear functions could also be used to calculate the storage, premigration, and recall throttles, such that the throttle values progressively increase as the amount of cache free space approaches the amount of free space corresponding to the maximum threshold.

What is claimed is:

1. A method in a virtual data storage system for adaptively throttling a transfer of data files into a cache storage to prevent overrunning said cache storage, said virtual data storage system having a storage interface appearing as a plurality of addressable virtual storage devices to a host processing system, said storage interface for receiving data files from said host processing system, and a storage manager for directing said data files between said cache storage and a plurality of storage volumes, said method comprising steps of:

(a) maintaining a cache free space within said cache storage, said cache free space defining a space within said cache storage available for storing subsequent data files;

(b) storing said data files received from said host processing system in said cache storage, said storing of data files decreasing said cache free space;

(c) migrating infrequently accessed data files from said cache storage to said plurality of storage volumes, frequently accessed data files remaining in said cache storage in anticipation of future requests from said host processing system, said migrating of data files increasing said cache free space;

(d) recalling said data files from said plurality of storage volumes to said cache storage when said host processing system requests to access one of said infrequently accessed data files, said recalling of data files decreasing said cache free space;

(e) monitoring said cache free space against a cache space threshold, said cache space threshold measuring a preferred amount of cache free space;

(f) computing a storage throttle when said cache free space decreases below said cache space threshold; and (g) using said storage throttle to delay said storing of data files and said recalling of data files into said cache storage to prevent overrunning said cache storage by completely depleting said cache free space.

2. The method in claim 1 wherein said cache space threshold includes a range of values having a minimum threshold and a maximum threshold, said minimum threshold denoting where a minimum storage throttle is needed to maintain said cache free space, said maximum threshold denoting where a maximum storage throttle is required to prevent said overrunning said cache storage.

3. The method in claim 2 wherein said storage throttle is computed as a linear progression between said minimum storage throttle and said maximum storage throttle based on said cache free space as compared to said minimum threshold and said maximum threshold.

4. The method in claim 2 wherein said storage throttle is computed as a non-linear progression between said minimum storage throttle and said maximum storage throttle, said storage throttle progressively increasing as said cache free space approaches said maximum threshold.

5. The method in claim 1 further comprising:

(h) measuring a resident cache storage as a percentage of cache storage occupied by resident files, said resident files defining data files stored in said cache storage, but not copied, or premigrated, to said plurality of storage volumes; and (i) computing a premigration throttle based on said resident cache storage, said premigration throttle delaying said copying of said resident files to said plurality of storage volumes as said resident cache storage decreases below a resident cache storage threshold.

6. The method in claim 5 wherein said premigration throttle is computed as a linear relation to said resident cache storage and said resident cache storage threshold.

7. The method in claim 5 wherein said premigration throttle is computed as a non-linear relation to said resident cache storage and said resident cache storage threshold, said premigration throttle progressively increasing as said resident cache storage approaches a minimum percentage.

8. The method in claim 5 further comprising:

(j) calculating a number of allowable concurrent recalls, said allowable concurrent recalls defining a number of storage devices reserved for concurrently recalling said data files from said plurality of storage volumes; and (k) computing a recall throttle based on said allowable concurrent recalls, said recall throttle delaying said recalling of said data files from said plurality of storage volumes as said allowable concurrent recalls increase.

9. The method in claim 8 wherein said step (f) further comprises selecting a system throttle as a maximum value of said storage throttle, said premigration throttle, and said recall throttle and using said system throttle to prevent overrunning said cache storage by delaying said storing data files and said recalling data files into said cache storage.

10. The method in claim 9 further comprising:

(l) maintaining reference information and storage volume location information in a database storage for each said data file stored in said plurality of storage volumes.

11. A virtual data storage system receiving data files from a host processing system comprising:

a storage interface coupled to said host processing system, said storage interface appearing as a plurality of virtual storage devices to said host processing system, each said virtual storage device addressable by said host processing system;

a cache storage for initially storing said data files received from said host processing system, said cache storage including a cache free space defining a space within said cache storage available for storing subsequent data files;

a plurality of storage volumes for ultimately storing said data files as logical volumes; and a storage manager coupled to said storage interface, said cache storage, and said plurality of storage volumes, said storage manager directing said data files received from said host processing system into said cache storage causing said cache free space to decrease, said storage manager also migrating said data files from said cache storage to said plurality of storage volumes such that frequently accessed data files remain in said cache storage in anticipation of future requests from said host processing system, said migrating of data files increasing said cache free space, said storage manager recalling said data files from said plurality of storage volumes to said cache storage when said host processing system requests to access a previously migrated data file, said recalling of data files decreasing said cache free space, said storage manager monitoring said cache free space against a cache space threshold, said storage manager further computing a storage throttle when said cache free space decreases below said cache space threshold, said storage manager using said storage throttle to prevent overrunning said cache storage by delaying said storing of data files and said recalling of data files to said cache storage.

12. The virtual data storage system in claim 11 wherein said cache space threshold includes a range of values having a minimum threshold and a maximum threshold, said minimum threshold denoting where a minimum storage throttle is needed to maintain said cache free space, said maximum threshold denoting where a maximum storage throttle is required to prevent said overrunning said cache storage.

13. The virtual data storage system in claim 12 wherein said storage manager computes said storage throttle as a linear function of said minimum storage throttle, said maximum storage throttle, and said cache free space relative to said minimum and said maximum thresholds.

14. The virtual data storage system in claim 12 wherein said storage manager computes said storage throttle as a non-linear function of said minimum storage throttle, said maximum storage throttle, and said cache free space relative to said minimum and said maximum thresholds, said storage throttle progressively increasing as said cache free space approaches said maximum threshold.

15. The virtual data storage system in claim 11 further comprising:
    a cache directory having an entry for each said data file stored in said cache storage, each entry including a data file type and a cache storage pointer.

16. The virtual data storage system in claim 15 wherein said storage manager scans said data file types in said cache directory to measure a resident cache storage as a percentage of cache storage occupied by resident files, said data file type indicating resident files as data files stored in said cache storage, but not copied, or premigrated, to said plurality of storage volumes.

17. The virtual data storage system in claim 16 wherein said storage manager computes a premigration throttle based on said resident cache storage, said premigration throttle delaying said copying of said resident files to said plurality of storage volumes as said resident cache storage decreases below a resident cache storage threshold.

18. The virtual data storage system in claim 15 further comprising:
    a plurality of storage devices, coupled to said storage manager, said cache storage, and said plurality of storage volumes, for migrating said data files from said cache storage and recalling said data files to said cache storage.

19. The virtual data storage system in claim 18 wherein said storage manager calculates a number of allowable concurrent recalls, said allowable concurrent recalls defining a number of storage devices reserved for concurrently recalling said data files to said cache storage.

20. The virtual data storage system in claim 19 wherein said storage manager computes a recall throttle based on said allowable concurrent recalls such that said recall throttle increases a delay in said recalling of said data files as said allowable concurrent recalls increase.

21. The virtual data storage system in claim 20 wherein said storage manager selects a system throttle as a maximum value of said storage throttle, said premigration throttle, and said recall throttle and uses said system throttle to prevent overrunning said cache storage by delaying said storing of data files and said recalling of data files into said cache storage.

22. The virtual data storage system in claim 21 further comprising:
    a database storage having an entry for each said data file stored in said plurality of storage volumes, each said entry including reference information and storage volume location information for each said data file.

23. The virtual storage system in claim 20 wherein said storage volumes are magnetic tape cartridges.

24. The virtual storage system in claim 20 wherein said storage volumes are optical disk cartridges.

25. The virtual storage system in claim 20 wherein said cache storage is a direct access storage device (DASD).

26. The virtual storage system in claim 20 wherein said cache storage is an electronic memory.

27. An article of manufacture for use in a virtual data storage system, said virtual data storage system having a storage interface appearing as a plurality of addressable virtual storage devices to a host processing system, said storage interface for receiving data files from said host processing system, said virtual data storage system further including a storage manager for directing said data files between a cache storage and a plurality of storage volumes, said storage manager adaptively throttling a transfer of data files into said cache storage to prevent overrunning said cache storage,
    said article of manufacture comprising a computer-readable storage medium tangibly embodying a program of executable computer instructions which may cause said storage manager to:
        (a) maintain a cache free space within said cache storage, said cache free space defining a space within said cache storage available for future storing of said data files;
        (b) store said data files received from said host processing system into said cache storage, said storing of data files decreasing said cache free space;
        (c) migrate infrequently accessed data files from said cache storage to said plurality of storage volumes, frequently accessed data files remaining in said cache storage in anticipation of future requests from said host processing system, said migrating of data files increasing said cache free space;
        (d) recall said data files from said plurality of storage volumes to said cache storage when said host processing system requests to access one of said infrequently accessed data files, said recalling of data files decreasing said cache free space;
        (e) monitor said cache free space against a cache space threshold, said cache space threshold measuring a preferred amount of cache free space;
        (f) compute a storage throttle when said cache free space decreases below said cache space threshold; and
        (g) use said storage throttle to delay said storing of data files and said recalling of data files into said cache storage to prevent overrunning said cache storage by completely depleting said cache free space.

28. The article of manufacture in claim 27 wherein said program of executable computer instructions may further cause said storage manager to:
    (h) measure a resident cache storage as a percentage of cache storage occupied by resident files, said resident files defining data files stored in said cache storage, but not copied, or premigrated, to said plurality of storage volumes; and
    (i) compute a premigration throttle based on said resident cache storage, said premigration throttle delaying said copying of said resident files to said plurality of storage volumes as said resident cache storage decreases below a resident cache storage threshold.

29. The article of manufacture in claim 28 wherein said program of executable computer instructions may further cause said storage manager to:
    (j) calculate a number of allowable concurrent recalls, said allowable concurrent recalls defining a number of storage devices reserved for concurrently recalling said data files from said plurality of storage volumes; and
    (k) compute a recall throttle based on said allowable concurrent recalls such that said recall throttle increases a delay in said recalling of said data files as said allowable concurrent recalls increase.

30. The article of manufacture in claim 29 wherein said program of executable computer instructions may further cause said storage manager to:

(l) select a system throttle as a maximum value of said storage throttle, said premigration throttle, and said recall throttle, said system throttle to prevent overrunning said cache storage by delaying said storing data files and said recalling data files into said cache storage.

* * * * *